United States Patent
Fukushi (10) Patent No.: US 12,372,843 B2
(45) Date of Patent: Jul. 29, 2025

(54) TUNGSTEN OXIDE POWDER AND ELECTROCHROMIC DEVICE USING THE SAME

(71) Applicants: KABUSHIKI KAISHA TOSHIBA, Tokyo (JP); TOSHIBA MATERIALS CO., LTD., Yokohama (JP)

(72) Inventor: Daisuke Fukushi, Yokohama (JP)

(73) Assignees: Kabushiki Kaisha Toshiba, Tokyo (JP); Toshiba Materials Co., Ltd., Yokohama (JP)

( * ) Notice: Subject to any disclaimer, the term of this patent is extended or adjusted under 35 U.S.C. 154(b) by 0 days.

(21) Appl. No.: 18/335,335

(22) Filed: Jun. 15, 2023

(65) Prior Publication Data

US 2023/0341739 A1    Oct. 26, 2023

Related U.S. Application Data

(63) Continuation of application No. PCT/JP2022/010076, filed on Mar. 8, 2022.

(30) Foreign Application Priority Data

Mar. 17, 2021    (JP) .................. 2021-043249

(51) Int. Cl.
| | | |
|---|---|---|
| *C01G 41/02* | (2006.01) | |
| *C01G 41/00* | (2006.01) | |
| *C09K 9/00* | (2006.01) | |
| *G02F 1/1524* | (2019.01) | |

(52) U.S. Cl.
CPC ......... *G02F 1/1524* (2019.01); *C01G 41/006* (2013.01); *C01G 41/02* (2013.01); *C09K 9/00* (2013.01); *C01P 2002/02* (2013.01); *C01P 2002/60* (2013.01); *C01P 2004/50* (2013.01); *C01P 2004/64* (2013.01); *C01P 2006/40* (2013.01); *C01P 2006/60* (2013.01)

(58) Field of Classification Search
CPC ......... C08K 2003/2258; C01P 2002/02; C01P 2002/90; C01P 2004/64; C01P 2004/82; C01P 2004/84; C01G 41/02
See application file for complete search history.

(56) References Cited

U.S. PATENT DOCUMENTS

| | | |
|---|---|---|
| 10,054,833 B2 | 8/2018 | Kailasam et al. |
| 10,283,776 B2 | 5/2019 | Sasaki et al. |
| 10,562,786 B2 | 2/2020 | Nakayama et al. |

(Continued)

FOREIGN PATENT DOCUMENTS

| | | |
|---|---|---|
| CN | 105060733 A | 11/2015 |
| CN | 108862389 A | 11/2018 |

(Continued)

OTHER PUBLICATIONS

Translation CN-11474211B (Year: 2023).*

(Continued)

*Primary Examiner* — Hoa (Holly) Le
(74) *Attorney, Agent, or Firm* — BURR PATENT LAW, PLLC (57) ABSTRACT

According to one embodiment, provided is a tungsten oxide powder including primary particles having an average particle size of 100 nm or less. Each of the primary particles include a crystal phase and an amorphous phase coexisting in each primary particle.

13 Claims, 2 Drawing Sheets

(56) References Cited

U.S. PATENT DOCUMENTS

| | | | |
|---|---|---|---|
| 2005/0248824 A1 | 11/2005 | Fukazawa et al. | |
| 2018/0370813 A1* | 12/2018 | Tsunematsu | ............ C08K 3/22 |
| 2019/0302561 A1 | 10/2019 | Rozbicki et al. | |
| 2020/0048107 A1 | 2/2020 | Shigesato et al. | |

FOREIGN PATENT DOCUMENTS

| | | | | |
|---|---|---|---|---|
| CN | 109021962 A | | 12/2018 | |
| CN | 111474211 B | * | 6/2023 | ........... G01N 27/041 |
| JP | S55-006357 A | | 1/1980 | |
| JP | S58-184131 A | | 10/1983 | |
| JP | 2004-205628 A | | 7/2004 | |
| JP | 2012-523019 A | | 9/2012 | |
| JP | 2017-538965 A | | 12/2017 | |
| KR | 10-2007-0016867 A | | 2/2007 | |
| MY | 188238 A | * | 11/2021 | ............ C01G 41/00 |
| WO | 2016/039157 A1 | | 3/2016 | |
| WO | 2017/159791 A1 | | 9/2017 | |
| WO | 2017/164821 A1 | | 9/2017 | |
| WO | 2018/199020 A1 | | 11/2018 | |
| WO | 2022/064922 A1 | | 3/2022 | |
| WO | 2022/181356 A1 | | 9/2022 | |

OTHER PUBLICATIONS

Ostermann et al., Preparation of nano-crystalline tungsten powders from gaseous WO2(OH)2, www.springer.com/42864; https://doi.org/10.1007/s42864-021-00118-1 (Year: 2021).*

International Search Report and Written Opinion (Application No. PCT/JP2022/010076) dated Jun. 7, 2022.

* cited by examiner

TUNGSTEN OXIDE POWDER AND ELECTROCHROMIC DEVICE USING THE SAME

CROSS-REFERENCE TO RELATED APPLICATIONS

This application is a Continuation application of PCT Application No. PCT/JP2022/010076, filed Mar. 8, 2022 and based upon and claiming the benefit of priority from prior Japanese Patent Application No. 2021-043249, filed Mar. 17, 2021, the entire contents of all of which are incorporated herein by reference.

FIELD

Embodiments described herein generally relate to a tungsten oxide powder and an electrochromic device using the same.

BACKGROUND

Electrochromic devices are devices utilizing an electrochemical oxidation-reduction reaction by voltage application. Thus, electrochromic devices can reversibly change from a transparent state to a colored state.

Electrochromic devices are used for displays or light-modulating systems. Examples of the light-modulating systems include light-modulating glass, light-modulating eyeglasses, and antidazzle mirror. The light-modulating systems are used in various fields such as vehicles, aircrafts, and buildings. For example, if used for a window glass of a building as a light-modulating glass, entry of sunlight can be switched ON and OFF.

As a material for an electrochromic device, tungsten oxide powder is used. For example, International Publication No. 2018/199020 discloses a tungsten oxide powder having a predetermined value measured by a spectroscopic ellipsometry method. The patent literature discloses that the response time improves by using the tungsten oxide powder described therein for an electrochromic device.

Furthermore, International Publication No. 2016/039157 discloses use of tungsten oxide powder having hopping conductivity in an electrochromic device.

DETAILED DESCRIPTION

According to one embodiment, provided is a tungsten oxide powder with primary particles having an average particle size of 100 nm or less. A crystal phase and an amorphous phase coexist in each of the primary particles of the tungsten oxide powder.

Improvement in the response time has been seen by use of the tungsten oxide powder of the patent literatures mentioned above for an electrochromic device. However, no further improvement has been seen. In addition, color unevenness occurs at the time of coloration.

After investigating the cause thereof, it has been found that each tungsten oxide powder requires both a crystal phase and an amorphous phase. International Publication No. 2018/199020, since the measurement is performed by the spectroscopic ellipsometry method, a deposited film having a thickness of 50 nm to 200 nm was necessary. Similarly, in International Publication No. 2016/039157, formation of a film was necessary, in order to measure activation energy. In these patent literatures, the tungsten oxide film is formed for evaluation. For this reason, the state as individual powder had not always been grasped.

The embodiment described herein can confront such problems and provides a tungsten oxide powder for an electrochromic device having a crystal phase and an amorphous phase.

A tungsten oxide powder according to an embodiment is a tungsten oxide powder with primary particles having an average particle size of 100 nm or less, and has feature in that a crystal phase and an amorphous phase coexist in each of the primary particles of the tungsten oxide powder.

Figure 1:
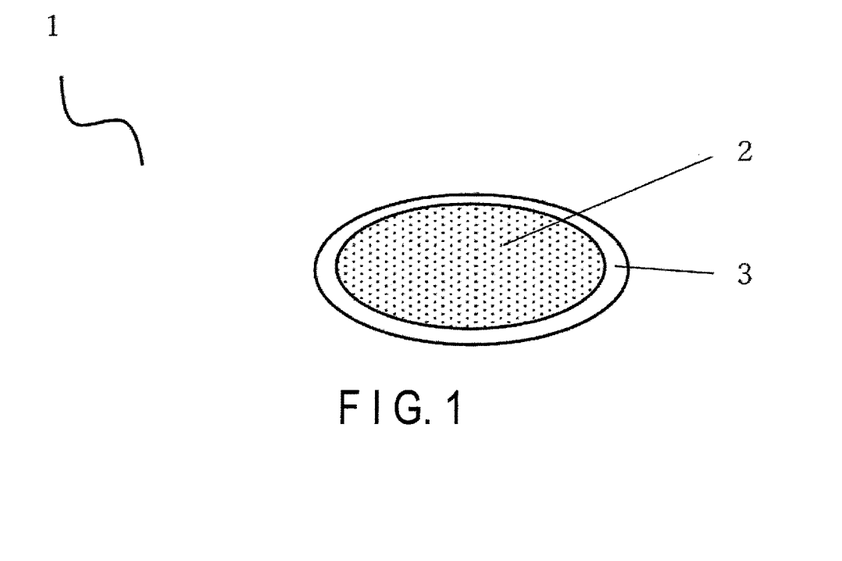
FIG. 1 shows an example of tungsten oxide powder according to an embodiment.

FIG. 1 shows an example of tungsten oxide powder for electrochromic devices according to the embodiment. Reference numeral 1 denotes tungsten oxide powder, 2 denotes a crystal phase, and 3 denotes an amorphous phase. FIG. 1 illustrates a primary particle of the tungsten oxide powder. The primary particle is a so-called single powder particle. A particle in which primary particles are aggregated to form one powder particle is referred to as a secondary particle. Tungsten oxide powder for electrochromic devices may be simply referred to as tungsten oxide powder.

In the tungsten oxide powder, the primary particles have an average particle size of 100 nm or less. If the average particle size is larger than 100 nm, the transparency decreases due to the particles being large. The lower limit of the average particle size is not particularly limited but is preferably 2 nm or more. If the average particle size is small, the primary particles may be easily aggregated. Therefore, the average particle size is preferably in the range of 2 nm to 100 nm, and more preferably in the range of 5 nm to 20 nm.

The average particle size is measured using a field emission scanning electron microscope (FE-SEM). A sample of the tungsten oxide powder is observed using FE-SEM to obtain an enlarged photograph. The longest diagonal of the tungsten oxide powder appearing in the enlarged photograph is taken as a particle diameter of the powder particle. An average value of 100 powder particle diameters that are arbitrarily extracted is defined as an average particle size. The magnification of the enlarged image obtained by the FE-SEM is set to 500,000 times or more.

In the primary particle of the tungsten oxide powder, a crystal phase and an amorphous phase coexist. For analysis of the crystal phase and the amorphous phase, HAADF-STEM is used. HAADF-STEM is high angle annular dark field-scanning transmission electron microscopy. Hereinafter, an HAADF-STEM image may be simply referred to as a STEM image. In performing STEM measurement, a thin film sample of the tungsten oxide powder is prepared with a microtome using a dispersion method. Also, the measurement is performed at a magnification of 10,000,000 with the accelerating voltage of the STEM set to 200 kV.

The crystal phase is a region in which regularity of the crystal phase can be confirmed. In the STEM image, the crystal phase is a plane in which white dots are arranged in a grid pattern or a border pattern at intervals of 0.3 nm to 0.5 nm.

That is, in the crystal phase, white dots are regularly arranged in the STEM image. The grid pattern herein refers to a state in which white dots are regularly arranged in a vertical direction and a horizontal direction. The grid pattern is synonymous with a checkerboard pattern. The border pattern refers to a state in which the arrangement is regular but with the arrangement being different in interval between a vertical direction and a horizontal direction. That is, the intervals in the vertical direction are the same, and the intervals in the horizontal direction are the same, but the intervals in the vertical direction are different from the intervals in the horizontal direction. The intervals in the vertical direction being different from the intervals in the horizontal direction indicates that the intervals are different by 0.1 nm or more.

The amorphous phase is a region in which regularity of a crystal lattice cannot be confirmed. In the STEM image, the amorphous phase is a white continuous plane in which a regular arrangement of atoms is not observed. In FIG. 1, white dots of the crystal phase 2 are indicated by black dots.

Tungsten oxide is stable as tungsten trioxide ($WO_3$) at room temperature. $WO_3$ has a monoclinic crystal structure. That is, the conventional tungsten oxide powder has a monoclinic structure and does not have an amorphous phase. In the tungsten oxide powder according to the embodiment, the crystal phase and the amorphous phase coexist. Thereby, the response time and the coloration efficiency can be improved.

In the above-described primary particles, the amorphous phase is preferably present in a range of 80% to 100% of the peripheral length of the crystal phase. Furthermore, in the primary particles, the amorphous phase is preferably present at 100% of the peripheral length of the crystal phase.

The tungsten oxide powder according to the embodiment may be primary particles each having a crystal phase and an amorphous phase coexisting therein. On the other hand, in the primary particles, if the amorphous phase is present in the range of 80% to 100% of the peripheral length of the crystal phase, the electrical conductivity of the primary particles can be improved. The amorphous phase does not have a specific crystal structure. Therefore, there is no grain boundary that serves as resistance. Thereby, the electrical conductivity of primary particles can be improved. Furthermore, with the amorphous phase being present at 80% or more of the peripheral length of the crystal phase, the response time for color switching can be improved. This is because the presence of the amorphous phase with low resistance at the periphery of the primary particle enables reaction regardless of the orientation of the powder. Therefore, in the primary particles, the amorphous phase is preferably present at 100% of the peripheral length of the crystal phase.

A state in which the tungsten oxide powder does not have an amorphous phase may be monocrystalline. In the monocrystalline powder, no grain boundary exists. On the other hand, when the amorphous phase is compared with the crystal phase, the amorphous phase has a lower resistance value. When an electrochromic layer is configured as described below, tungsten oxide powder particles come into contact with each other. When the tungsten oxide powder particles are in contact with each other, the resistance can be reduced by having an amorphous phase. For monocrystalline powders, when the powder particles are in contact with each other, the resistance value increases. Therefore, it is preferable to have an amorphous phase.

The maximum width of the amorphous phase of each primary particle is preferably 0.1 nm to 5 nm. The width of the amorphous phase is a length of the amorphous phase along a straight line drawn from the outer periphery of the primary particle toward the center point. A longest length of the amorphous phase in one primary particle is defined as the maximum width of the length of the amorphous phase. The center point of the primary particle refers to the center of gravity.

Figure 2:
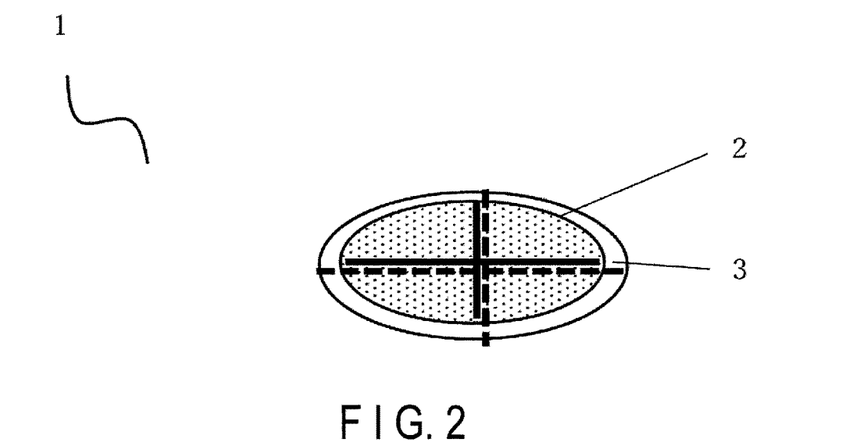
FIG. 2 shows an example of how to determine a crystal phase diameter and widths of an amorphous phase.

An example of how to determine a width of each phase is shown in FIG. 2. Reference numerals in the figure are the same as those in FIG. 1. In the illustrated example, as indicated by a solid line, lines are drawn along the major axis and the minor axis so that the center point of the crystal phase 2 of the tungsten oxide powder 1 becomes a point of intersect. The center of gravity of the tungsten oxide powder 1 is assumed to be the center point. The lengths of the respective lines are defined as a major axis width and a minor axis width of the crystal phase 2. For the amorphous phase 3, the center point of the primary particle of the tungsten oxide powder 1 is used as reference as described above. In FIG. 2, the center point of the primary particle is shown as the intersection of the dashed lines respectively lying along the major and minor axes. As in this example, the center point of the crystal phase 2 and the center point of the entire primary particle may differ in position. The respective center points may be at the same position. A line is drawn from each point on the circumference of the primary particle to the center point (not shown), and the length of the amorphous phase along the line is taken as the width at each point.

If the maximum width of the amorphous phase is less than 0.1 nm, the effect attained by providing the amorphous phase may be insufficient. If the maximum width of the amorphous phase is greater than 5 nm, the proportion of the crystal phase decreases. If the proportion of the crystal phase decreases, the degree of color change at the time of coloration may decrease. Therefore, the maximum width of the amorphous phase of each primary particle is preferably within the range of 0.1 nm to 5 nm, and more preferably in the range of 0.2 nm to 4 nm. Furthermore, the maximum width is still more preferably within the range of 0.5 nm to 3 nm. If the amorphous phase is present at 100% of the peripheral length of the crystal phase of the primary particle, the maximum width of the amorphous phase is preferably 0.2 nm or more. The width of the amorphous phase may be less than 0.1 nm at portions not exhibiting the maximum width.

The ratio of the maximum width of the amorphous phase to the maximum diameter of the primary particle is preferably in the range of ¼ or less. This indicates that the maximum width of the amorphous phase/the maximum diameter of the primary particle=0.25 or less. If the ratio of the maximum width of the amorphous phase/the maximum diameter of the primary particle is greater than 0.25, the proportion of the crystal phase may decrease. If the ratio of the maximum width of the amorphous phase/the maximum diameter of the primary particle is 0.25 or less, the effect attained by having the amorphous phase and the crystal phase coexist is easily obtained.

In the primary particle, when the area of the crystal phase is taken to be A1 and the area of the amorphous phase is taken to be B1, the ratio of the amorphous phase area B1/the crystal phase area A1 is preferably in the range of 0.2 to 0.8.

If B1/A1 is within the range of 0.2 to 0.8, the response time for color switching and the coloration efficiency can be improved.

B1/A1 is determined as follows. A STEM image is printed on paper. Printing is performed so that the primary particle has a particle size of 3 cm to 10 cm on the printed paper. A4 size is recommended as the size of the sheet. The crystal phase and the amorphous phase are respectively cut out from the printed paper. The cutouts are measured with a precision balance. As the precision balance, one capable of measuring to 0.1 mg is used. The ratio of the mass of the cutout paper of the amorphous phase to the mass of the cutout paper of the crystal phase is deemed to be B1/A1. This operation is carried out for five different particles, and the average value is taken as B1/A1.

If B1/A1 can be obtained by image analysis of the STEM image, image analysis may be used. In the case of using image analysis, as well, five different particles are analyzed, and the average value thereof is taken as B1/A1.

The response time for color switching is a time required for switching from a colored state to a transparent state (or from a transparent state to a colored state). As the response time becomes faster, the time required to switch from a colored state to a transparent state (or from a transparent state to a colored state) decreases. If the response time increases, switching between a colored state and a transparent state can be performed quickly.

The coloration efficiency is the amount of charge required for color switching. When the coloration efficiency ($cm^2/C$) is large, color switching can be caused with a small amount of charge.

If B1/A1 is less than 0.2, the electrical conductivity of the tungsten oxide powder may be insufficient. If there is a decrease in electrical conductivity, the response time may be insufficient. If B1/A1 is greater than 0.8, the proportion of the crystal phase decreases. If the crystal phase decreases, the coloration efficiency may decrease. Therefore, B1/A1 is preferably within the range of 0.2 to 0.8, and more preferably 0.3 to 0.7.

The crystal phase area A1 is a total area of crystal phases in one grain of primary particle. The amorphous phase area B1 is a total area of amorphous phases in one grain of primary particle. For example, if there are two amorphous phases in one grain of primary particle, the total area of the two phases is taken to be B1.

In the tungsten oxide powder according to the embodiment, a crystal phase and an amorphous phase coexist in the primary particle. In addition, by having the amorphous phase present around the crystal phase and controlling the maximum width of the amorphous phase, the area ratio between the amorphous phase and the crystal phase, and the like, the performance can be improved. These may be used alone or in combination with each other. When all the conditions are satisfied, the performance is most improved.

In addition, it is preferable to include tungsten oxide powder containing 0.01 mol % to 50 mol % of any one or more selected from the group consisting of potassium, sodium, lithium, or magnesium. By containing these elements in the tungsten oxide powder, the electrical conductivity of the tungsten oxide powder can be increased. By increasing the electrical conductivity of the tungsten oxide powder, the response time can be increased. If the content is less than 0.01 mol %, the effect attained by containing them is insufficient. Furthermore, if the content exceeds 50 mol %, the benefits of tungsten oxide cannot be taken advantage of. Therefore, the content is preferably 0.01 mol % to 50 mol %, and more preferably 1 mol % to 20 mol %. More of the potassium, sodium, lithium, and magnesium are preferably distributed in the amorphous phase than in the crystal phase. The amorphous phase has an effect of increasing the electrical conductivity. By distributing these elements in the amorphous phase, the effect of increasing the electrical conductivity can be further obtained.

The contents of potassium, sodium, lithium, and magnesium are expressed in terms of metal simple substance. For example, when potassium is contained in the tungsten oxide powder, the potassium may be present as an oxide of potassium (including a composite oxide). The definition by metal simple substance conversion makes measurement of the content easy.

The proportional content of potassium or the like can be measured by energy dispersive X-ray spectrometry (EDX) analysis. Hereinafter, a method of determining the content of potassium will be exemplified. Note that the contents of sodium, lithium, and magnesium should be understood to be those when potassium is replaced with the respective element.

Through the EDX analysis, color-mapping of potassium contained in the tungsten oxide powder is performed. As the measurement conditions, the accelerating voltage is set to 15.0 kV, an area analysis is performed at a magnification of 1,000 or more, and the potassium abundance is determined from a ratio of the number of atoms between K (potassium) and W (tungsten) obtained according to the ZAF method.

The ZAF method is a correction method combining three corrections, which are atomic-number correction (Z), absorption correction (A), and fluorescence correction (F). The atomic-number correction (Z) is for correcting the ratio at which electrons applied to the sample are split into intruding electrons and scattered electrons. The absorption correction (A) is for correcting the amount of characteristic X-rays generated in the sample that are absorbed before exiting outside the sample. The fluorescence (excitation) correction (F) is for correcting the fluorescent X-ray intensity excited by the X-rays generated in the sample. The ZAF method is a common method as a correction method for EDX.

Figure 3:
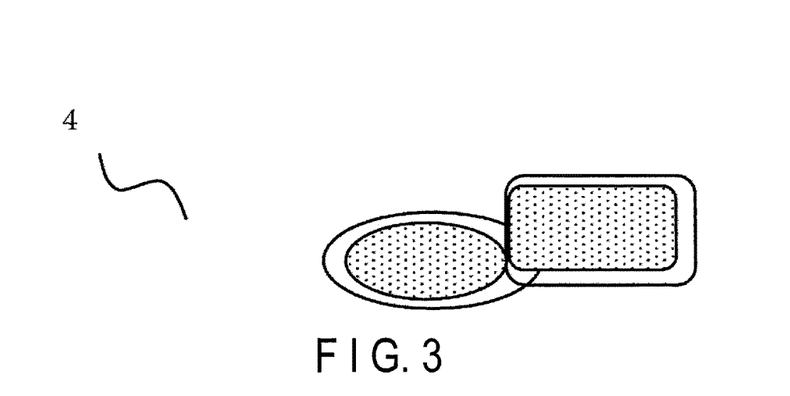
FIG. 3 shows another example of the tungsten oxide powder according to the embodiment.

Secondary particles each in which the primary particles are bonded via the amorphous phases of the primary particles may be included. FIG. 3 shows an example of a secondary particle. In the figure, reference numeral 4 denotes a secondary particle of the tungsten oxide powder. FIG. 3 shows a state in which the primary particles 1 of the tungsten oxide powder are bonded via the amorphous phases 3. Here, the wording "via amorphous phases" refers to a state in which at least parts of two tungsten oxide powder particles are linked via amorphous phases. Therefore, it indicates a case where amorphous phases are present between crystal phases of the tungsten oxide powder or a state where parts of crystal phases are linked by amorphous phases. While FIG. 3 illustrates a state in which two primary particles are bonded, three or more may be bonded, as well.

As described above, the amorphous phase 3 has an effect of increasing the electrical conductivity of the tungsten oxide powder. With bonding via the amorphous phase 3, the electrical conductivity can be increased.

In the secondary particles, when the area of the crystal phase is taken to be A2 and the area of the amorphous phase is taken to be B2, the ratio of the amorphous phase area B2/the crystal phase area A2 is preferably within the range of 0.2 to 0.8. With the ratio B2/A2 being within the range of 0.2 to 0.8, decrease in electrical conductivity can be suppressed even if secondary particles are present. By controlling the ratio of B1/A1 as the primary particles and the ratio of B2/A2 as the secondary particles, the performance can be improved. The crystal phase area A2 of the secondary particles is a total area of crystal phases in the secondary particle. The amorphous phase area B2 of the secondary particles is a total area of amorphous phases in the secondary particle.

Figure 4:
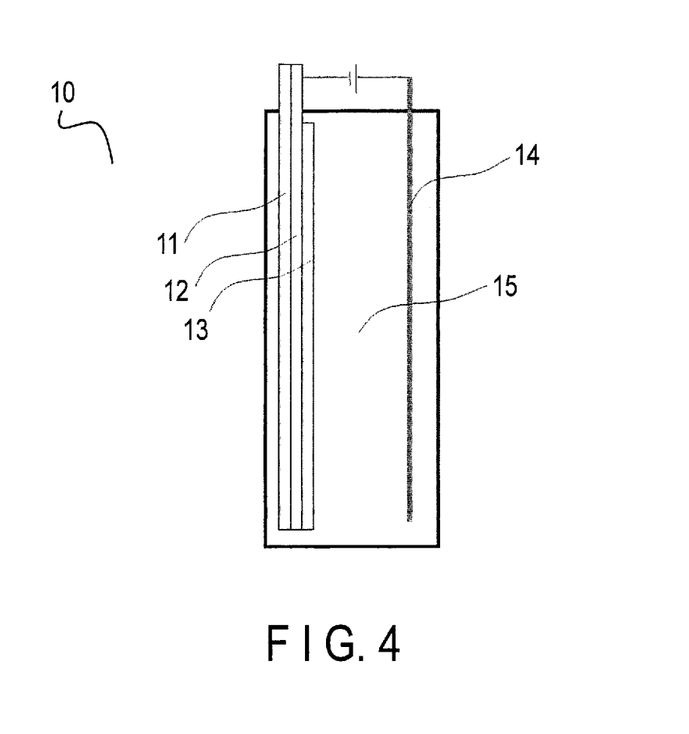
FIG. 4 shows an example of a cell structure of an electrochromic device.

The tungsten oxide powder as described above can be used for an electrochromic layer. FIG. 4 shows an example of a cell structure of an electrochromic device. In the figure, reference numeral 10 denotes a cell, 11 denotes a glass substrate, 12 denotes a transparent electrode, 13 denotes an electrochromic layer, 14 denotes a counter electrode, and 15 denotes an electrolyte.

FIG. 4 is a schematic view of a cell structure of the electrochromic device. The glass substrate 11 has good light transmittance. If light transmission is not desired, a glass substrate need not be used. The transparent electrode 12 may be made of a material such as ITO.

The electrochromic layer 13 uses the tungsten oxide powder according to the embodiment. A tungsten oxide powder paste is applied onto the transparent electrode 12 and dried to form the electrochromic layer 13. The drying step is preferably performed in the range of 120° C. to 270° C. The counter electrode 14 may be made of platinum or the like. The counter electrode 14 is provided on a glass substrate, which is not shown. The electrolyte 15 is filled between the electrochromic layer 13 and the counter electrode 14. The surrounding of the electrolyte 15 is sealed. Upon application of voltage to the transparent electrode 12 and the counter electrode 14, the electrochromic layer 13 becomes transparent.

An electrochromic device can switch between the transparent and colored states by turning on and off of electric charges. Electrochromic devices are used for displays or light-modulating systems. Examples of the light-modulating systems include light-modulating glass, light-modulating eyeglasses, and antidazzle mirror. The light-modulating systems are used in various fields such as vehicles, aircrafts, and buildings. For example, in case of use for a window glass of a building as a light-modulating glass, it is possible to switch ON and OFF the entry of sunlight. In addition, transmission of ultraviolet light can be suppressed. In other words, it can be said to be suitable for the electrochromic device for controlling ON and OFF entry of sunlight.

The electrochromic layer 13 preferably contains the tungsten oxide powder according to the embodiment in a range of 50% by mass to 100% by mass. If the content of the tungsten oxide powder according to the embodiment is small, the effect may be lowered. When the tungsten oxide powder according to the embodiment is contained in an amount of 50% by mass or more, a volume resistance value of the electrochromic layer can be $1 \times 10^5$ Ωcm or less. With the electrochromic layer containing the tungsten oxide powder according to the embodiment, the volume resistance value can be lowered. Thus, the response time can be enhanced.

Next, a method of producing the tungsten oxide powder according to the embodiment will be described. The method of producing the tungsten oxide powder according to the embodiment is not limited as long as the powder has the above-described structure; examples of a method of producing the tungsten oxide powder with a high yield are as follows.

Examples of the method of producing the tungsten oxide material according to the embodiment include two types of methods, a vapor phase method and a liquid phase method. In either production method, first, a precursor of tungsten oxide is prepared.

If a vapor phase method is used, a sublimation step is applied to the tungsten oxide precursor. Examples of the precursor of the tungsten oxide include ammonium tungstate, $WO_3$, $WO_2$, and $H_2WO_4$. The tungsten oxide precursor is prepared as a powder or slurry.

If potassium, sodium, lithium, or magnesium is added, a precursor thereof is added. Potassium, sodium, lithium and magnesium are referred to as doping agents, and precursors thereof are referred to as doping agent precursors. For example, the precursor of potassium may be $K_2WO_4$, the precursor of sodium may be $Na_2WO_4$, the precursor of lithium may be $Li_2WO_4$, and the precursor of magnesium may be $MgWO_4$. The tungsten oxide precursor and the doping agent precursor are mixed. A sublimation step is applied to the mixture. By adjusting the mixing ratio of the tungsten oxide precursor and the doping agent precursor, the content ratio of the doping agent can be controlled.

In the sublimation step, a plasma flame is used. The precursor is introduced into a plasma flame using argon (Ar), nitrogen (N), or oxygen (O) as a carrier gas and sublimated. For example, the precursor mixture is heated to 10000° C. or higher in a plasma flame to be sublimated. The sublimated gas is rapidly cooled to room temperature in an oxygen atmosphere to obtain tungsten oxide powder. By controlling the rate at which the precursor is fed into the plasma, the particle size of the resulting powder particles can be controlled. For example, by feeding the sample at 6000 g/h or less, the average particle size can be made 100 nm or less.

For controlling the area ratio of the amorphous phase, it is effective to adjust the volume ratio between an inert gas and oxygen gas in the carrier gas. The inert gas is nitrogen or argon. The ratio of the volume of inert gas/the volume of (inert gas+oxygen gas) is preferably within the range of 0.3 to 0.6. If the ratio of the volume of inert gas/the volume of (inert gas+oxygen gas) is less than 0.3, an amorphous phase hardly forms. In addition, because the amount of oxygen is too great, the primary particles of the tungsten oxide powder may be excessively large. If the ratio of the volume of inert gas/the volume of (inert gas+oxygen gas) is greater than 0.6, the amount of oxygen is too little and metallic tungsten or $WO_2$ is formed, which may reduce the amount of $WO_3$ to be formed. Therefore, by setting the ratio of the volume of inert gas/the volume of (inert gas+oxygen gas) to be in the range of 0.3 to 0.6, the proportion of the amorphous phase can be controlled.

Furthermore, the feeding rate of the precursor is preferably within the range of 200 g/h to 5000 g/h. As described above, the feeding rate is effective in controlling the average particle size. Controlling the feeding rate is also effective in controlling the proportion of the crystal phase. Controlling the feeding rate serves to control the contact time between the precursor and the plasma flame. Controlling the contact time between the precursor and the plasma flame can control the proportion of the crystal phase. If less than 200 g/h, the feeding amount is little, and the proportion of the crystal phase may increase. If greater than 5000 g/h, the proportion of the crystal phase may decrease.

If a liquid phase method is used, a process of dissolving the tungsten oxide precursor with alkali, a process of precipitating the tungsten oxide powder, and a process of filtering and drying the obtained powder are used. As the precursor of the tungsten oxide, for example, ammonium tungstate, $WO_3$, $WO_2$, or $H_2WO_4$ can be used.

If a doping agent such as potassium is contained, a doping agent precursor is used. For example, $K_2WO_4$ or KOH can be used as a precursor of potassium, $Na_2WO_4$ or NaOH can be used as a precursor of Na, $LiWO_4$ can be used as a precursor of Li, and $MgWO_4$ or $Mg(OH)_2$ can be used as a precursor of Mg. If a doping agent is added, a precursor of the doping agent is mixed during the process of dissolving the tungsten oxide precursor with alkali.

In the process of dissolving the tungsten oxide precursor with alkali, the tungsten oxide precursor is dispersed in water, and dissolved by adjusting the pH with ammonia or KOH to be in the range of 9 to 11. It is a process of preparing the precursor into an alkaline aqueous solution.

The process of precipitating the tungsten oxide powder is a process of adjusting the pH of the alkaline aqueous solution to be in the range of pH 5 to 7 with hydrochloric acid (HCl). The $WO_3$ powder can be precipitated by neutralizing the alkaline aqueous solution. Sulfuric acid ($H_2SO_4$) solutions or nitric acid ($HNO_3$) solutions may be used instead of hydrochloric acid. Here, the width of the peripheral section (amorphous phase) is controlled by adjusting the HCl concentration (mass ratio) of the hydrochloric acid solution (for example, aqueous hydrochloric acid) at the time of neutralization (adjustment to pH 5 to 7). Through precipitation with a HCl solution having a concentration of 30% or less, a core of $WO_3$ is formed first, and on the surface thereof, an amorphous phase is formed.

As for the mixing rate of the hydrochloric acid solution, the time from the state in which the precursor is dissolved at ph 9 to 11 to the completion of neutralization is set to be preferably in the range of 0.5 hours to 5 hours, and more preferably in the range of 0.5 hours to 1.5 hours. Through this process, tungsten oxide powder having the amorphous phase formed around the crystal phase can be obtained. If the neutralization completion time is less than 0.5 hours (30 minutes), the proportion of the crystal phase may decrease. If the neutralization completion time is longer than 1.5 hours, the proportion of the crystal phase may increase.

The powdery precipitate obtained by the neutralization is filtered and dried to recover the powder. The drying temperature is 200° C. to 400° C. Heating at a temperature above 400° C. increases the area of the crystal phase and further increase the particle size. At a drying temperature below 200° C., Cl (chlorine) may remain in the powder.

The Cl remaining in the tungsten oxide powder is preferably kept in the range of 0% by mass to 0.1% by mass. If left remaining in the tungsten oxide powder, Cl may become bonded to the electrolyte of the electrochromic device. If the remaining Cl and the electrolyte are bonded to each other, the coloration efficiency of the electrochromic device may be lowered. The content of Cl in the tungsten oxide powder is measured by ion chromatography. As a measuring device, ICS-2100 manufactured by Thermo Fisher Scientific Inc. or an equivalent thereof is used. As a sample, the tungsten oxide powder is subjected to hydrothermal treatment at 120° C. for 8 hours to extract a solution containing Cl. The Cl content of 0% by mass also includes that resulting from the measurement limit or less. The tungsten oxide powder produced using a plasma flame should have a Cl content of 0% by mass because no hydrochloric acid is used in the production processes.

EXAMPLES

Examples 1 to 11 and Comparative Examples 1 to 3

Tungsten oxide powders according to Examples 1 to 9 and Comparative Examples 1 and 2 were prepared through a vapor phase method. In the vapor phase method, a plasma flame at 10000° C. or higher was used. A mixed gas of nitrogen and oxygen was used as a carrier gas. The precursors, volume ratios of nitrogen/oxygen of the carrier gas, and feeding rates were as shown in Table 1.

TABLE 1

| | Precursor | Volume Ratio of Nitrogen/ (Nitrogen + Oxygen) of Carrier Gas | Feeding Rate (g/h) |
|---|---|---|---|
| Example 1 | Ammonium Tungstate | 0.5 | 300 |
| Example 2 | Ammonium Tungstate | 0.3 | 500 |
| Example 3 | Ammonium Tungstate | 0.6 | 500 |
| Example 4 | Ammonium Tungstate | 0.5 | 200 |
| Example 5 | Ammonium Tungstate | 0.3 | 50000 |
| Example 6 | Ammonium Tungstate + $K_2WO_4$ | 0.4 | 400 |
| Example 7 | Ammonium Tungstate + $Na_2WO_4$ | 0.3 | 700 |
| Example 8 | Ammonium Tungstate + $Li_2WO_4$ | 0.6 | 200 |
| Example 9 | Ammonium Tungstate + $MgWO_4$ | 0.5 | 300 |
| Comparative Example 1 | Ammonium Tungstate | 0.8 | 100 |
| Comparative Example 2 | Ammonium Tungstate | 0.2 | 200 |

Through the above processes, the tungsten oxide powders according to the examples were produced. Example 6 is an example with 9 mol % of potassium contained, Example 7 is an example with 50 mol % of sodium contained, Example 8 is an example with 0.3 mol % of lithium contained, and Example 9 is an example with 5 mol % of magnesium contained. Comparative Example 1 is an example where the volume ratio of nitrogen/(nitrogen+oxygen) of the carrier gas and the feeding amount were set outside the preferable ranges. Comparative Example 2 is an example where the volume ratio of nitrogen/oxygen of the carrier gas was set outside the preferred range.

For Examples 10 and 11 and Comparative Example 3, tungsten oxide powders were produced by a liquid phase synthesis method. Ammonium tungstate was used as a precursor. Ammonia was used for the process of dissolving the precursor with alkali. Hydrochloric acid was used for the process of neutralization. The times for neutralizing the pH of the alkaline aqueous solution and the drying temperatures were as shown in Table 2.

TABLE 2

| | pH of Alkaline Aqueous Solution | pH after Neutralization | Neutralization Time (h) | Drying Temperature (° C.) |
|---|---|---|---|---|
| Example 10 | 9.5 | 5.5 | 0.5 | 250 |
| Example 11 | 10.5 | 6.5 | 1.5 | 360 |
| Comparative Example 3 | 10.5 | 6.0 | 24 | 250 |

The amorphous phase and the crystal phase of the tungsten oxide powder according to each example and comparative example were examined. The average particle diameter of the primary particles was measured by FE-SEM. Regarding the amorphous phase and the crystal phase, STEM images were used. The details were as described above. The results are shown in Tables 3 and 4.

TABLE 3

| | Primary Particles Average Particle Size (nm) | Presence or Absence of Amorphous Phase | Proportion of Amorphous Phase along Peripheral Length of Crystal Phase (%) | Maximum width of Amorphous Phase (nm) | Amorphous Phase Area B1/ Crystal Phase Area A1 Ratio | Minimum Width of Amorphous Phase (nm) |
|---|---|---|---|---|---|---|
| Example 1 | 8 | Present | 100 | 2.0 | 0.4 | 0.5 |
| Example 2 | 30 | Present | 100 | 4.5 | 0.4 | 1.1 |
| Example 3 | 7 | Present | 97 | 3.2 | 0.7 | 1.5 |
| Example 4 | 50 | Present | 100 | 4.9 | 0.3 | 1.8 |
| Example 5 | 9 | Present | 100 | 0.8 | 0.8 | 0.3 |
| Example 6 | 10 | Present | 98 | 2.3 | 0.7 | 0.8 |
| Example 7 | 6 | Present | 95 | 0.2 | 0.8 | 0.2 |
| Example 8 | 80 | Present | 88 | 0.9 | 0.2 | 0.3 |
| Example 9 | 14 | Present | 92 | 1.5 | 0.4 | 0.5 |
| Example 10 | 32 | Present | 82 | 3.3 | 0.7 | 1.1 |
| Example 11 | 45 | Present | 90 | 4.2 | 0.3 | 1.3 |
| Comparative Example 1 | 150 | Present | 40 | 10 | 0.9 | 8 |
| Comparative Example 2 | 8 | Not present | 0 | 0 | 0 | 0 |
| Comparative Example 3 | 160 | Present | 70 | 0.5 | 0.1 | 0.1 |

TABLE 4

| | Secondary Particles | |
|---|---|---|
| | Presence or Absence of Bonding between Amorphous Phases | Ratio of Amorphous Phase Area B2/ Crystal Phase Area A2 |
| Example 1 | Present | 0.3 |
| Example 2 | Present | 0.3 |
| Example 3 | Present | 0.5 |
| Example 4 | Not present | 0.3 |
| Example 5 | Present | 0.7 |
| Example 6 | Present | 0.6 |
| Example 7 | Present | 0.7 |
| Example 8 | Not present | 0.2 |
| Example 9 | Present | 0.4 |
| Example 10 | Not present | 0.7 |
| Example 11 | Not present | 0.3 |
| Comparative Example 1 | Present | 0.9 |
| Comparative Example 2 | Present | 0 |
| Comparative Example 3 | Present | 0.05 |

As can be seen from the tables, the amorphous phase was formed in a preferable state in the examples.

In addition, the amount of chlorine in the tungsten oxide powder according to each example and comparative example was measured. The measurement results were all in the range of 0% by mass to 0.1% by mass.

Next, electrochromic devices each having an electrochromic layer using the tungsten oxide powder according to an example or comparative example was produced.

The electrochromic devices had the structure shown in FIG. 4. A transparent electrode 12 was provided on a glass substrate 11 having a width of 8 mm. The transparent electrode 12 was made of ITO. A tungsten oxide powder paste was applied onto the transparent electrode 12 so as to have a dry film thickness of 0.3 μm to 3 μm. Through drying at about 200° C., an electrochromic layer 13 was obtained. This was placed in a glass silica cell having an optical path length of 1 cm. The cell was filled with an electrolyte. For a counter electrode 14, platinum was used. The counter electrode 14 was placed in the cell.

The volume resistance value of the electrochromic layer was measured. The volume resistance value is measured as follows. A φ20 mm cylindrical unit is filled with 1 g to 3 g of sample powder. As a measurement method, a four-terminal method is used, in which the four terminals are linearly arranged at an electrode interval of 3 mm. A volumetric resistivity is measured with pressures of 4 N (Newtons), 8 N, 12 N, 16 N and 20 N being applied to the sample by a hydraulic jack, and the lowest value of the volumetric resistivity is defined as the volumetric resistivity of the material. The reciprocal of the obtained volumetric resistivity is calculated, and thus converted into electrical conductivity.

The response time and the coloration efficiency of the electrochromic device were also examined.

As for the response time (s), the rate (seconds) of turning from the colored state into the transparent state was measured. The coloration efficiency ($cm^2/C$) is a charge amount for performing color switching. For measurement of the response time and the coloration efficiency, the electrochromic device shown in FIG. 4 was used.

The response time was measured with an ultraviolet-visible absorptiometer, and was defined as the time required for the transmittance of light of a wavelength of 600 nm to change from 20% to 70% when a voltage of 1.2 was applied.

The coloration efficiency was determined by measuring the absorbance with the ultraviolet-visible absorptiometer and using the following equation: Coloration efficiency ($cm^2/C$)=amount of change in absorbance at 600 nm/ [(amount of charge (C) applied)/$WO_3$ coating area ($cm^2$)] Here, the unit of the amount of charge is coulomb (C). The film thickness of the electrochromic layer was 1 μm. The results are shown in Table 5.

TABLE 5

| | Volume Resistance Value (Ω · cm) | Response Time (s) | Coloration Efficiency ($cm^2/C$) |
|---|---|---|---|
| Example 1 | $2 \times 10^5$ | 10 | 60 |
| Example 2 | $2 \times 10^5$ | 11 | 65 |
| Example 3 | $1 \times 10^5$ | 9 | 66 |

TABLE 5-continued

|  | Volume Resistance Value (Ω·cm) | Response Time (s) | Coloration Efficiency (cm²/C) |
|---|---|---|---|
| Example 4 | $4 \times 10^5$ | 9 | 63 |
| Example 5 | $8 \times 10^4$ | 14 | 67 |
| Example 6 | $8 \times 10^4$ | 8 | 70 |
| Example 7 | $3 \times 10^4$ | 7 | 75 |
| Example 8 | $4 \times 10^5$ | 14 | 72 |
| Example 9 | $7 \times 10^4$ | 7 | 74 |
| Example 10 | $3 \times 10^5$ | 12 | 60 |
| Example 11 | $4 \times 10^5$ | 14 | 61 |
| Comparative Example 1 | $5 \times 10^6$ | 25 | 35 |
| Comparative Example 2 | $3 \times 10^6$ | 35 | 45 |
| Comparative Example 3 | $8 \times 10^6$ | 50 | 20 |

As can be seen from the table, the electrochromic layers according to the examples had the volume resistance value of $4 \times 10^5$ Ω·cm or less. It can be seen that the volume resistance value as the electrochromic layer was reduced. Furthermore, improvements in response time and coloration efficiency were also confirmed. Therefore, it can be seen that the performances of the electrochromic devices using the tungsten oxide powders according to the examples have improved.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention. In addition, each of the above-mentioned embodiments can be carried out in combination with one another.

What is claimed is:

1. A tungsten oxide powder comprising secondary particles, the secondary particles comprising primary particles having an average particle size of 100 nm or less, each of the primary particles comprising a crystal phase and an amorphous phase coexisting in each primary particle, wherein in each of the primary particles, the amorphous phase is present at a range of 80% to 100% of a peripheral length of the crystal phase, and the primary particles in the secondary particles are bonded via the amorphous phases thereof.

2. The tungsten oxide powder according to claim 1, wherein in each of the primary particles, the amorphous phase is present at 100% of a peripheral length of the crystal phase.

3. The tungsten oxide powder according to claim 1, wherein a ratio B1/A1 of an area B1 of the amorphous phase to an area A1 of the crystal phase in each of the primary particles is within a range of 0.2 to 0.8.

4. The tungsten oxide powder according to claim 1, wherein the average particle size is within a range of 5 nm to 20 nm.

5. The tungsten oxide powder according to claim 1, comprising a tungsten oxide powder containing 0.01 mol % to 50 mol % of any one or more selected from the group consisting of potassium, sodium, lithium, and magnesium.

6. The tungsten oxide powder according to claim 1, wherein a maximum width of the amorphous phase in each of the primary particles is 0.1 nm to 5 nm.

7. The tungsten oxide powder according to claim 6, wherein a ratio B1/A1 of an area B1 of the amorphous phase to an area A1 of the crystal phase in each of the primary particles is within a range of 0.2 to 0.8.

8. The tungsten oxide powder according to claim 7, wherein the average particle size is within a range of 5 nm to 20 nm.

9. The tungsten oxide powder according to claim 8, wherein a ratio B2/A2 of an area B2 of the amorphous phase to an area A2 of the crystal phase in the secondary particles is within a range of 0.2 to 0.8.

10. The tungsten oxide powder according to claim 8, for use in an electrochromic device.

11. The tungsten oxide powder according to claim 1, for use in an electrochromic device.

12. An electrochromic device comprising an electrochromic layer, the electrochromic layer comprising the tungsten oxide powder according to claim 1.

13. The electrochromic device according to claim 12, wherein the electrochromic layer has a volume resistance value of $1 \times 10^5$ Ω·cm or less.

* * * * *